Oct. 9, 1962 K. E. SNYDER 3,057,225
TRANSMISSION
Filed May 4, 1959 2 Sheets-Sheet 1
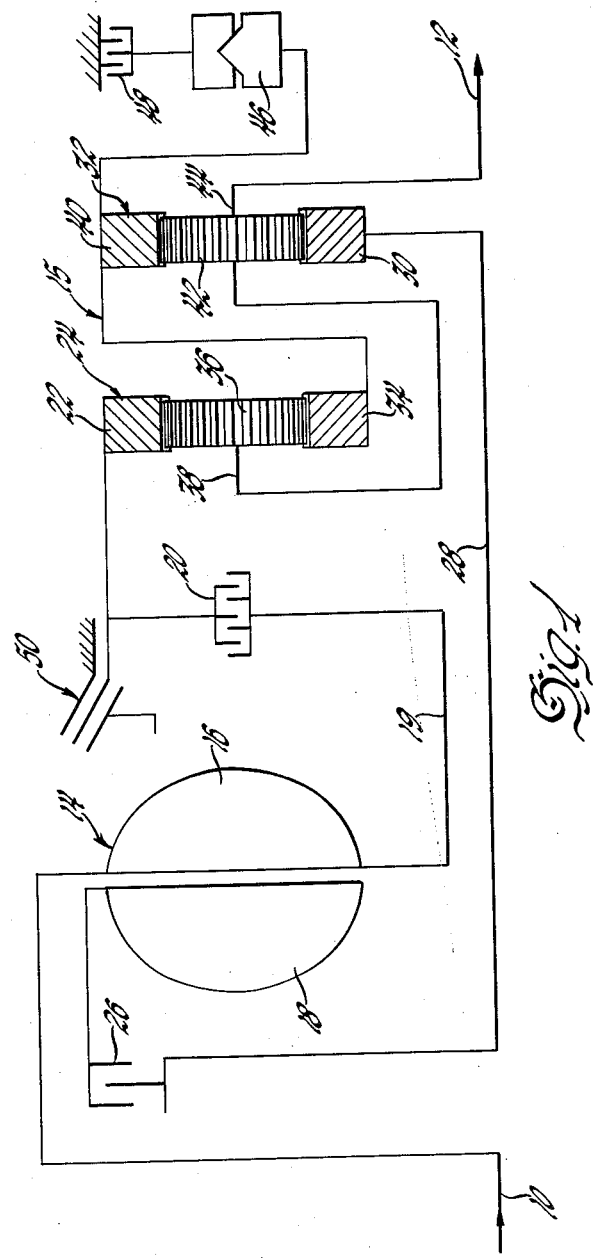
INVENTOR.
Kenneth E. Snyder
BY
Hugh L. Fisher
ATTORNEY

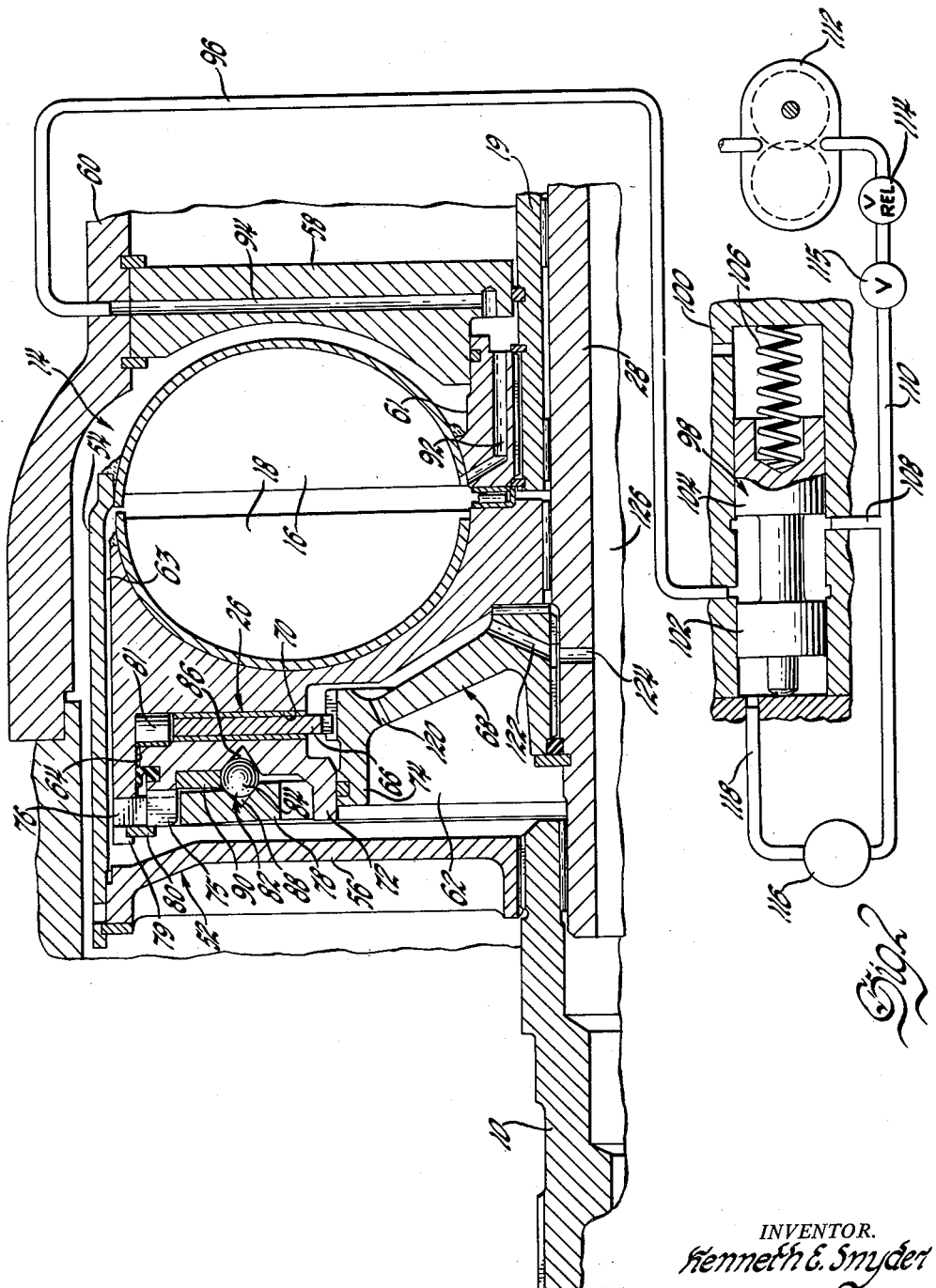

United States Patent Office 3,057,225
Patented Oct. 9, 1962

3,057,225
TRANSMISSION
Kenneth E. Snyder, Northville, Mich., assignor to General Motors Corporation, Detroit, Mich., a corporation of Delaware
Filed May 4, 1959, Ser. No. 810,683
12 Claims. (Cl. 74—677)

This invention relates generally to power transmissions, and particularly to hydrodynamic torque transmitting devices adapted, although not exclusively, for use therewith.

In the vehicle power transmission field, a hydrodynamic torque transmitting device, such as a fluid coupling, may be utilized not only to obtain a so-called fluid start but also may be combined with change speed gearing to vary the ratios of the gearing. To explain the latter application further, consider a simple planetary gear unit comprising ring and sun gears arranged so as to intermesh with a series of pinions journaled on a planet carrier. If one of the gears is held against rotation while the other performs as an input and the carrier as an output, an underdrive ratio results. To change to a direct drive, some type clutch is generally employed to join together either the two gears or the carrier and one of the gears so as to lock up the gear unit for unitary drive. If a conventional friction clutch is employed, then in changing from the underdrive ratio to the direct drive ratio, a relatively rough transition can occur unless the clutching and braking actions are timed properly. For this reason, a fluid coupling is preferable because the fluid therein does absorb many of the drive line shocks as well as cause the coupling to smoothly and gradually assume torque loads; however, a coupling presents problems because of the need to empty and fill the coupling for the required clutching action.

With the foregoing in mind, the invention contemplates the provision of a hydrodynamic torque transmitting device that may be rendered effective and ineffective without filling and emptying the device. By the invention, there is always maintained within the hydrodynamic device a predetermined quantity of fluid adequate when under pressure to enable the device to transmit a desired torque.

More specifically, the foregoing device is combined with a fluid pressure actuated clutch so that when the fluid in the device is pressurized or charged, the clutch is also rendered operative and the device and clutch together transmit torque to a load member.

According to the invention, and by one form thereof, a fluid coupling comprising an impeller and a turbine is installed in a drive train so that the impeller is drive connected to an input and the turbine is arranged to be drive connected to an output through a clutch. The clutch is housed within a control chamber, which is situated adjacent the coupling and which is in fluid communication with the coupling. The coupling further includes an inlet joined through a control valve to a suitable source of fluid pressure and a restricted outlet.

When the control valve interrupts communication between the coupling inlet and the source of fluid pressure, the pressure on each side of the clutch is balanced through the action of the restricted outlet. Therefore, the clutch is spring disengaged thereby interrupting the drive connection between the turbine and the output. To render the coupling and clutch effective to connect the input and output, the control valve is positioned so as to establish communication between the coupling inlet and the source of fluid pressure. The fluid then within the coupling becomes charged or pressurized at a predetermined value that is adequate to engage the clutch. Assisting the fluid in engaging the clutch is a ball energizer so arranged that upon initial engaging movement of the clutch, the ball energizer becomes effective to complete the engagement.

The foregoing and other objects and advantages of the invention will become apparent from the following description and from the accompanying drawings in which:

FIGURE 1 depicts schematically a transmission incorporating a hydrodynamic torque transmitting device constructed according to the invention; and FIGURE 2 illustrates a sectional view of a specific embodiment of the hydrodynamic torque transmitting mechanism.

Referring first to FIGURE 1, the transmission shown for demonstrating the invention comprises an input shaft 10, which may be connected to a power source such as a vehicle engine (not shown) and an output shaft 12, which may be drive connected in a known manner to vehicle wheels (not shown). In the drive train between the input and output shafts 10 and 12, a hydrodynamic torque transmitting device such as a fluid coupling 14 and change speed gearing viewed generally at 15 are so situated that the transmission will provide three forward speeds and a reverse, as will become apparent.

The fluid coupling 14 has an impeller 16 and a turbine 18, both provided with vanes, so that through the agency of fluid, drive is transferred from the impeller 16 to the turbine 18 in the usual way. The impeller 16 is joined by a sleeve 19 and an impeller or second speed clutch 20 to an input ring gear 22 for the change speed gearing front unit 24, whereas the turbine 18 is joined by a turbine clutch 26 to one end of an intermediate shaft 28. The opposite end of the intermediate shaft is connected to an input sun gear 30 for the change speed gearing rear unit 32.

In the gearing 15 the front unit 24 is further made up of a reaction sun gear 34 arranged along with the input ring gear 22 to intermesh with a series of planet pinions 36 journaled on an output carrier 38 for the front unit 24. In the rear unit 32 a reaction ring gear 40 meshes as does the sun gear 30 with a series of planet pinions 42 rotatably supported on an output carrier 44. The front and rear unit reaction gears 34 and 40 are connected together as are the front and rear unit carriers 38 and 44 with the rear unit carried 44 being connected to the output shaft 12. During forward operation the reaction gears 34 and 40 are prevented from reverse rotation by the combined action of a one-way device 46 and a forward brake 48, and during reverse operation a reverse brake 50 holds the front unit ring gear 22 as will be explained. The one-way device 46 may be of any known construction employing sprag rollers, or the equivalent, to prevent relative rotation between two members. Also, the brakes 48 and 50 and the clutch 20 may be fluid actuated in any appropriate way.

The operation of the transmission is as follows: In neutral, both the forward and reverse brakes 48 and 50 are disengaged. As a result, the change speed gearing 15 is rendered ineffective to transfer drive to the output shaft 12, there being no reaction for the gearing 15. Also, the impeller clutch 20 is disengaged, the turbine clutch 26 may be disengaged if desired, and the coupling 14 is preferably filled in a way to be described for instant starting when wanted.

To commence vehicle movement, the vehicle forward brake 48 is engaged as is the turbine clutch 26. The drive train then proceeds from the input shaft 10 through the fluid coupling 14 and the turbine clutch 26 to the rear unit input sun gear 30. With the input sun gear 30 being revolved forwardly, the reaction ring gear 40 will attempt to revolve backwards. This backward rotational tendency will be prevented by the one-way device 46 and the forward brake 48 so that the carrier 44, and accordingly the output shaft 12, will be caused to revolve forwardly at a reduced speed determined by the rear unit tooth proportions. The fluid coupling 14, as can be seen, affords a fluid start since the impeller 16 must be revolved at some predetermined speed above idle before the coupling 14 will transmit sufficient torque to commence movement of the vehicle.

In second speed, the turbine clutch 26 is disengaged and the impeller clutch 20 engaged. Therefore, the coupling 14 is no longer effective and the drive proceeds from the input shaft 10 through impeller clutch 20 to the front unit input ring gear 22. The forward rotation of the input ring gear 22 will cause the reaction sun gear 34 to attempt to revolve backwards in the same way as the rear unit ring gear 40, but the forward brake 48 and the one-way device 46 will also prevent this. Consequently, the output carrier 38 will be revolved at a reduced speed relative to the input shaft 10 and drive both the rear unit carrier 44 and the output shaft 12 at a somewhat faster speed than in first speed.

For third speed, the impeller clutch 20 remains engaged and the turbine clutch 26 is re-engaged. Consequently, drive from the input shraft 10 is transferred both to the front unit input ring gear 22 and the rear unit input sun gear 30. With both of these gears 22 and 30 revolving at substantially the same speed, a slight differential in speeds being due to the inherent fluid slippage in the coupling 14, the front and rear unit reaction gears 34 and 40 and the front unit carriers 38 and 44 will all be revolved forwardly at about the same speed, this being permitted by the one-way device 46. As a result, a substantially direct drive is established between the input shaft 10 and the output shaft 12.

For reverse, the forward brake 48 and the impeller clutch 20 are both disengaged and the turbine clutch 26 and the reverse brake 50 are both engaged. Hence, drive is transferred from the input shaft 10 through the coupling 14, turbine clutch 26, intermediate shaft 28 and to the rear unit input sun gear 30. The resultant forward rotation of the rear unit sun gear 30 will cause the rear unit ring gear 40 to revolve backwards, which is permitted with the forward brake 48 disengaged, and carry therewith the front unit sun gear unit 34. Since the front unit ring gear 22 is held by the reverse brake 50 against the tendency to revolve forwardly induced by the reverse rotation of the sun gear 34, the carrier 38 will be forced to revolve backwardly at a reduced speed. This reverse rotation will be transferred from the front unit carrier 38 to the rear unit carrier 44 and to the output shaft 12.

The details and mode of operation of the fluid coupling 14 and turbine clutch 26 will become apparent from the following description of the structure depicted in FIGURE 2. As viewed, the actual drive connection between the input shaft 10 and the coupling impeller 16 is made through a housing member 52 formed in two parts. One part, an annular ring 54, at the rear end is welded or otherwise attached to the impeller 16 and at the forward end is connected to the outer end of the other part, a radially extended flange 56. The hub of the flange 56 is in turn splined to the input shaft 10. Completion of the enclosure of the coupling 14 is made at the rear end by a fluid transfer flange 58, which flange at the outer periphery is affixed to a casing 60 for the transmission and at the inner periphery has a sealing engagement with the sleeve 19 and a hub portion 61 of the impeller 16. With this arrangement of parts, a fluid-tight control chamber 62 is provided ahead of the coupling 14 and communicates through a rim passage 63 with the coupling working circuit.

The turbine clutch 26 is positioned in this control chamber 62 within an annular recess 64 formed in the front side of the turbine 18. The clutch 26 includes a single clutch plate 66 of suitable friction material splined at the inner end to a clutch hub 68 in turn splined to and axially positioned on the intermediate shaft 28. On the turbine side of the clutch plate 66, the plate 66 is adapted to engage a radial face 70 of the recess 64 and on the opposite side, a piston 72. Piston 72 is slidably and sealingly in engagement both with the annular recess 64 and a ledge 74 formed on the clutch hub 68. Connection between the turbine 18 and the piston 72 is made through a series of spaced laterally extending piston teeth 75 that interengage teeth 76 formed on a reaction plate 78. These teeth 76 on the reaction plate also engage mating teeth 79 on the turbine 18. A snap ring 80 axially positions the entire clutch assemblage relative to the turbine 18. Preferably a spring 81 of the wave type, urges the piston 72 to a clutch disengaged position, whereas the fluid when under pressure in the control chamber 62 urges the piston 72 to the clutch engaged position as will become apparent.

To assist the fluid pressure in moving the piston 72 to the engaged position, an energizing device viewed generally at 82 is employed. The energizing device 82 includes a series of balls 84 stationed within circumferentially spaced pockets 86 and 88 respectively formed in the piston 72 and the reaction plate 78 and restrained against outward movement by a ball retaining ring 90. These pockets 86 and 88 are provided with ramps that, when engagement of the clutch 26 is commenced by fluid pressure acting on the piston 72, will, due to the resultant wedging action between the ramps and the balls 84, produce additional engaging force. The wedging action results from relative movement between the reaction plate 78 and the piston 72 when clutch engagement is commenced. This is because the reaction plate 78 will be revolving with the turbine 18 while the piston 72 will tend to lag behind the reaction plate 78 as the frictional engagement starts, this relative movement being permitted due to the fact that the piston teeth 75 are a predetermined amount smaller than the spaces provided by the teeth 76 in the reaction plate 78. Once engagement of the clutch 26 commences, a twist occurs due to this relative movement between the reaction plate 78 and the piston 72, which, although slight, is sufficient to cause the balls 84 to be urged along the ramps of the pockets 86 and 88 and thereby supplement fluid pressure in forcing the piston 72 to the engaged position.

Not only does the energizing device 82 provide additional engaging pressure, but the engagement is also more positive and smoother with resultant greater clutch plate life. Additionally, the clutch 26 can be smaller with fewer plates required, as evidenced by the need for only one plate in this embodiment. Of course, if the torque loads require additional plates, they may be provided.

Fluid under pressure is supplied to the coupling 14 through an inlet passage 92 formed in the hub portion 61 of the impeller 16. This inlet passage 92 is in communication with a passage 94 in the fluid transfer flange 58 and passage 94 is in turn in communication with a coupling supply line 96 from the control system.

The control system has been considerably simplified and only that needed to demonstrate the invention is shown. As illustrated, a control valve or shift valve 98 determines when fluid under pressure is to be delivered to the coupling supply line 96. The control valve 98 is slidingly housed within a bore in a valve body 100 and is of the spool type comprising spaced lands 102 and 104. A spring 106 is employed for urging the control valve 98 to the downshifted position viewed, in which the lands 102 and 104 allow communication between ports connected to the coupling supply line 96 and a branch 108 of a pump supply line 110. Pump supply line 110 extends to a suitable pump 112, preferably driven by the input shaft 10 so as to deliver fluid under pressure as soon as the input shaft 10 starts to revolve. In the pump supply line 110 there is a pressure regulator valve 114 and a selector valve 115, each of an appropriate construction, with the pressure regulator valve 114 producing some desired pressure and the selector valve 115 delivering this pressure to the control valve 98 in accordance with the operational requirements of the operator selected transmission setting. Also, in communication with the pump supply line 110 is a suitable hydraulic governor 116 driven at the speed of the output shaft 12 so as to produce a vehicle speed conscious governor pressure in a governor supply line 118 extending to the left end of control valve 98. When governor pressure is adequate, then the control valve 98 will be moved to the right and to the upshifted position, thus interrupting the supply of fluid pressure to the coupling supply line 96. This control valve 98 and others of similar consturction may be utilized for the required shifts as will become clearer from the operational summary to follow.

The discharge of fluid when under pressure from the coupling 14 takes place through a restricted outlet passage 120 formed in the clutch hub 68. The outlet passage 120 is of a selected area and communicates on one side with the control chamber 62 and on the other side with passages 122 and 124 respectively in the clutch hub 68 and the intermediate shaft 28. Passage 124 in sequence communicates with a lube channel 126 in the intermediate shaft 28. The fluid in this channel 126 is utilized for lubrication purposes after which it may be returned to a transmission sump (not shown). Also relieving to lube offers a pressure differential such that the pressure on the spring side of piston 72 is less than that in the control chamber 62. Hence, the clutch 26 will be maintained engaged. The restricted outlet 120 will not lower the pressure sufficiently to interfere with the operation thereof but will maintain a continuous bleed for cooling and for lubrication.

When the fluid in the control chamber 62 and coupling 14 is not under pressure except that due to rotation, the centrifugal effect will prevent flow to lube channel 126. However, the communication allowed by outlet passage 120 of the fluid in control chamber 62 with the spring side of piston 72 will have a balancing effect, i.e., both sides of the piston 72 will be exposed to the same pressures. Therefore, the spring 81 will maintain the clutch 26 disengaged.

To summarize and correlate the operation of the coupling 14 and turbine clutch 26 with the FIGURE 1 transmission, it will be assumed that the transmission is in Neutral and the input shaft 10 is being revolved. As explained, because the forward brake 48 is disengaged, drive cannot be transferred to the output shaft 12, and therefore, the coupling 14 and turbine clutch 26 can either be rendered operative or inoperative. But so that the first speed can be quickly established, it will be further assumed that the coupling 14 is supplied fluid under pressure through the selector valve 115 and the control valve 98 from the pump 112. This will result in the fluid within the working circuit of the coupling 14 being charged, and accordingly, the fluid in the control chamber 62. Hence, the clutch 26 will be engaged by the combined action of the fluid pressure acting on piston 72 and the wedging action from the energizing device 82. When the forward brake 48 is engaged to commence operation in first speed, the coupling 14 and clutch 26 will immediately start the transfer of drive to the rear unit input sun gear 30 as has been described.

When the transmission is shifted to second speed, it is necessary to render the coupling 14 ineffective. Consequently, the control valve 98 is so arranged that the governor pressure supplied thereto by the governor 116 through governor supply line 118 will be adequate to move the control valve 98 to the upshifted position and cut off further supply of fluid pressure to the coupling 14. Instanteously then, the pressure within the coupling 14 and the control chamber 62 will be decreased with the outlet passage 120 allowing the pressure on each side of the clutch piston 72 to be equal. This pressure balance will permit the clutch 26 to be disengaged by the spring 81. Therefore, the drive connection between the turbine 18 and the intermediate shaft 28 will be interrupted so as to establish second speed, but without the need for completely draining the coupling 14.

For third speed, the coupling 14 must again become effective and this can be accomplished by another shift valve or control valve (not shown) similar to control valve 98. When the proper vehicle speed is attained, fluid pressure will be delivered to the coupling 14 and the fluid remaining within the coupling 14 and the control chamber 62 will become imemdiately charged and again the clutch 26 will be engaged in the foregoing manner, completing the drive connection between the coupling turbine 18 and the intermediate shaft 28.

The downshifts from third to second and first occur in the same manner as the upshifts with the coupling 14 being energized and deenergized in accordance with the requirements of each speed ratio.

From the foregoing, it can be seen that there is no need for draining and emptying the coupling 14 during a ratio change, and as a result the problems, e.g., viscosity, foaming, cavitation, and others, encountered when draining and filling a coupling are avoided. The coupling 14 is immediately responsive to torque transmitting demands without objectionable slippage since the coupling 14 is always prepared for operation as soon as the fluid therein is charged. The inherent ability of the coupling 14 to absorb shocks and offer the smooth and imperceptible ratio transitions has not been in any way reduced by this arrangement. Additionally, the energizing device 82 contributes to the efficient and smooth operation.

The invention is to be limited only by the following claims.

I claim:

1. In combination, an input, an output, a hydrodynamic torque transmitting device including an impeller drive connected to the input and a turbine, and means for rendering the device effective and ineffective to transfer drive while maintaining a predetermined minimum quantity of fluid in the device, the means including a clutch interposed between the turbine and the output and means pressurizing and depressurizing the fluid within the device at different impeller speeds, the clutch being so arranged as to be rendered operative and inoperative to join the turbine and output together when the fluid within the hydrodynamic torque transmitting device is respectively pressurized and depressurized.

2. In combination; an input; an output; a hydrodynamic torque transmitting device including an impeller drive connected to the input and a turbine; and means for rendering the device effective and ineffective to transfer drive while maintaining a predetermined minimum quantity of fluid within the device, the means including a clutch interposed between the turbine and the output and means pressurizing and depressurizing the fluid within the device at different impeller speeds, the pressurizing and depressurizing means also controlling the engaging and disengaging fluid pressures acting on the clutch so that the clutch is rendered operative and inoperative to join together the turbine and the output when the fluid within the device is respectively pressurized and depressurized.

3. In combination, an input, an output, a hydrodynamic torque transmitting device including an impeller drive connected to the input and a turbine, the device being provided with an inlet and a restricted outlet, a source of fluid pressure in communication with the inlet, a clutch operative to drive connect the turbine and the output, the clutch being operated by the fluid pressure within the device, the restricted outlet being so arranged as to control the engaging and disengaging fluid pressures acting on the clutch, and means for controlling communication between the inlet and the source and coacting with the restricted outlet so as to pressurize and depressurize the fluid within the device and thereby render the device, respectively, effective and ineffective to transfer drive.

4. In combination, an input, an output, a fluid coupling including an impeller drive connected to the input and a turbine, a source of fluid pressure, the fluid coupling being provided with an inlet arranged to be connected to the source and a restricted outlet, a control chamber in communication with the fluid within the coupling, a clutch arranged within the control chamber so as to be rendered operaive by a predetermined pressure within the coupling and join together the turbine and the output, the restricted outlet being so positioned as to control the engaging and disengaging fluid pressures acting on the clutch, and valve means for controlling communication between the inlet and the source and coacting with the restricted outlet so as to pressurize and depressurize the fluid within the coupling and thereby cause the clutch to become, respectively, operative and inoperative.

5. In combination, an input, an output, a fluid coupling including an impeller drive connected to the input and a turbine, a source of fluid pressure, the fluid coupling being provided with an inlet arranged to be connected to the source and a restricted outlet, a control chamber in communication with the fluid within the coupling, a clutch arranged within the control chamber so as to be rendered operative by a predetermined pressure within the coupling and join together the turbine and the output, valve means for controlling communication between the inlet and the source and coacting with the restricted outlet so as to cause the fluid within the coupling to be pressurized and depressurized, the restricted outlet being arranged so that the engaging and disengaging fluid pressures acting on the clutch when less than the predetermined pressure exists are in a selected proportion that enables the clutch to be rendered inoperative and so that a selected differential exists between the engaging and disengaging fluid pressures when fluid within the coupling is pressurized thereby enabling the clutch to be rendered operative, and an energizing device for assisting the fluid pressure within the coupling in rendering the clutch operative.

6. In combination, an input shaft, an output shaft, a housing member poined to the input shaft, a fluid coupling including an impeller drive connected to the housing member and a turbine interposed between the housing member and the impeller, the housing member and fluid coupling together forming a control chamber, a clutch hub joined to the output shaft, the turbine being provided with a recess therein, a source of fluid pressure, a friction clutch positioned within the recess and arranged so as to interconnect the turbine and the clutch hub, the clutch including a piston exposed to the fluid pressure within the control chamber and arranged so as to engage the clutch when a predetermined pressure exists in the control chamber, a spring for urging the piston to the disengaged position, and a ball energizing device for assisting the piston in engaging the clutch, the coupling being provided with an inlet at a hub portion thereof and a restricted outlet for causing the fluid pressure within the control chamber to be delivered to opposing sides of the piston so that the spring will disengage the clutch when less than the predetermined pressure exists in the control chamber and for producing a controlled bleed from the control chamber when the predetermined pressure exists therein, and a control valve for joining the source to the inlet of the coupling so as to pressurize the fluid within the coupling and the control chamber and engage the clutch thereby causing drive to be transferred between the input and output shafts.

7. In a transmission; the combination of an input; an output; change speed gearing interposed between the input and the output; ratio changing mechanisms for so controlling the gearing as to provide a plurality of drive ratios therethrough; the ratio controlling mechanisms including a hydrodynamic torque transmitting device having an impeller drive connected to the input and a turbine; and means for rendering the device effective and ineffective to transfer drive while maintaining a predetermined minimum quantity of fluid within the device; the means including a clutch interposed between the turbine and the output and means pressurizing and depressurizing the fluid within the device at different impeller speeds, the pressurizing and depressurizing means also controlling the engaging and disengaging fluid pressures acting on the clutch so that the clutch is rendered operative and inoperative to cause the turbine and the output to be drive connected when the fluid within the device is, respectively, pressurized and depressurized.

8. In a transmission; the combination of an input; an output; change speed gearing interposed between the input and the output; ratio changing mechanisms for so controlling the gearing as to provide a plurality of drive ratios therethrough, the ratio controlling mechanisms including a fluid coupling having an impeller drive connected to the input and a turbine, a source of fluid pressure, the fluid coupling being provided with an inlet arranged to be connected to the source and a restricted outlet, a control chamber in communication with the fluid within the coupling, a clutch arranged within the control chamber so as to be rendered operative by a predetermined pressure within the coupling and join together the turbine and the output, and valve means for controlling communication between the inlet and the source and coacting with the restricted outlet so as to cause the fluid within the coupling to be pressurized and depressurized, the restricted outlet being arranged so that the engaging and disengaging fluid pressures acting on the clutch when less than the predetermined pressure exists are in a selected proportion that enables the clutch to be rendered inoperative and so that a selected differential exists between the engaging and disengaging fluid pressures when the fluid within the coupling is pressurized thereby enabling the clutch to be rendered operative.

9. In a transmission, the combination of an input, an output, change speed gearing interposed between the input and the output, ratio changing mechanisms for so controlling the gearing as to provide a plurality of drive ratios therethrough, the ratio controlling mechanisms including a housing member joined to the input shaft, a fluid coupling including an impeller drive connected to the housing member and a turbine interposed between the housing member and the impeller, the housing member and fluid coupling together forming a control chamber, a clutch hub joined to the output shaft, the turbine being provided with a recess therein, a source of fluid pressure, a friction clutch positioned within the recess and arranged so as to interconnect the turbine and the clutch hub, the clutch including a piston exposed to the fluid pressure within the control chamber and arranged so as to engage the clutch when a predetermined pressure exists in the control chamber, a spring for urging the piston to the disengaged position, and a ball energizer for assisting the piston in engaging the clutch, the coupling being provided with an inlet at a hub portion thereof and a restricted outlet for causing the fluid pressure within the control chamber to be delivered to opposing sides of the piston so that the spring will disengage the clutch when less than the predetermined pressure exists in the control chamber and for producing a controlled bleed from the control chamber when the predetermined pressure exists therein, and a control valve for joining the source to the inlet of the coupling so as to pressurize the fluid within the coupling and the control chamber and engage the clutch thereby causing drive to be transferred between the input and output shafts.

10. In combination, an input, an output, a hydrodynamic torque transmitting device including an impeller drive connected to the input and a turbine, and means rendering the device effective and ineffective to transfer drive while maintaining a predetermined quantity of fluid in the device, the means including a clutch interposed between the turbine and the output, and means pressurizing and depressurizing the fluid within the device at different impeller speeds and over a predetermined speed range, the pressurizing and depressurizing means including a source of fluid pressure for the device, the clutch being so arranged as to be rendered operative and inoperative to join the turbine and output together when the fluid within the hydrodynamic torque transmitting device is respectively pressurized and depressurized.

11. In combination; an input; an output; a hydrodynamic torque transmitting device including an impeller drive connected to the input and a turbine; and means rendering the device effective and ineffective to transfer drive while maintaining a predetermined minimum quantity of fluid within the device; the means including a clutch interposed between the turbine and the output and means pressurizing and depressurizing the fluid within the device at different impeller speeds and over a predetermined speed range; the pressurizing and depressurizing means including a source of fluid pressure for the device and also being arranged so as to control the engaging and disengaging fluid pressures acting on the clutch so that the clutch is rendered operative and inoperative to join together the turbine and the output when the fluid within the device is respectively pressurized and depressurized.

12. In a transmission; the combination of an input; an output; change speed gearing interposed between the input and the output; ratio changing mechanisms for so controlling the gearing as to provide a plurality of drive ratios therethrough; the ratio controlling mechanisms including a hydrodynamic torque transmitting device having an impeller drive connected to the input and a turbine; and means rendering the device effective and ineffective to transfer drive while maintaining a predetermined minimum quantity of fluid within the device; the means including a clutch interposed between the turbine and the output and means pressurizing and depressurizing the fluid within the device at different impeller speeds and over a predetermined speed range, the pressurizing and depressurizing means including a source of fluid pressure for the device and also being so arranged as to control the engaging and disengaging fluid pressures acting on the clutch so that the clutch is rendered operative and inoperative to cause the turbine and the output to be drive connected when the fluid within the device is respectively pressurized and depressurized.

References Cited in the file of this patent

UNITED STATES PATENTS

| | | |
|---|---|---|
| 2,529,400 | Lapsley | Nov. 7, 1950 |
| 2,736,407 | Smirl | Feb. 28, 1956 |
| 2,866,361 | Gatiss | Dec. 30, 1958 |
| 2,882,684 | Kelley | Apr. 21, 1959 |